(12) United States Patent
Rice

(10) Patent No.: US 6,502,883 B2
(45) Date of Patent: Jan. 7, 2003

(54) TWO STAGE BODY MOUNT REBOUND CUSHION

(75) Inventor: Bernie W. Rice, Thorndale (CA)

(73) Assignee: Cooper Technology Services, LLC, Findlay, OH (US)

( * ) Notice: Subject to any disclaimer, the term of this patent is extended or adjusted under 35 U.S.C. 154(b) by 242 days.

(21) Appl. No.: 09/729,548

(22) Filed: Dec. 4, 2000

(65) Prior Publication Data
US 2002/0121793 A1 Sep. 5, 2002

(51) Int. Cl.⁷ ............................................. B62D 24/04
(52) U.S. Cl. ..................................... 296/35.1; 267/220
(58) Field of Search ...................... 296/35.1; 267/63 R, 267/8 R, 220

(56) References Cited

U.S. PATENT DOCUMENTS

| | | |
|---|---|---|
| 1,871,963 A | 8/1932 | Dill |
| 2,132,840 A * | 10/1938 | Workman et al. .......... 296/35.1 |
| 2,208,709 A | 7/1940 | Tjaarda |
| 2,769,656 A | 11/1956 | Lee |
| 2,838,339 A | 6/1958 | Schaldenbrand |
| 2,926,881 A | 3/1960 | Painter |
| 2,976,080 A | 3/1961 | Moore |
| 3,159,391 A | 12/1964 | Wilfert et al. |
| 3,250,565 A | 5/1966 | Jaskowiak |
| 3,350,042 A | 10/1967 | Stewart et al. |
| 3,479,081 A | 11/1969 | Schaaf |
| 3,622,194 A | 11/1971 | Bryk |
| 3,809,427 A | 5/1974 | Bennett |
| 3,927,730 A | 12/1975 | Winslow |
| 3,990,737 A | 11/1976 | Palmer |
| 4,012,071 A | 3/1977 | Jones et al. |
| 4,014,588 A | 3/1977 | Kohriyama et al. |
| 4,258,820 A | 3/1981 | Miura et al. |
| 4,260,176 A * | 4/1981 | Pacis et al. ................. 267/220 |
| 4,274,655 A | 6/1981 | Lederman |
| 4,298,193 A | 11/1981 | Mourray |
| 4,407,491 A | 10/1983 | Kunihiro et al. |
| 4,607,828 A * | 8/1986 | Bodin et al. ................. 267/220 |
| 4,783,039 A | 11/1988 | Peterson et al. |
| 4,798,370 A | 1/1989 | Inuzuka |
| 4,921,203 A | 5/1990 | Peterson et al. |
| 4,958,812 A | 9/1990 | Wolf et al. |
| 5,024,425 A | 6/1991 | Schwerdt |
| 5,103,529 A * | 4/1992 | Konig ....................... 296/35.1 |
| 5,121,905 A | 6/1992 | Mann et al. |
| 5,127,698 A | 7/1992 | König |
| 5,158,269 A | 10/1992 | Hein et al. |
| 5,170,985 A | 12/1992 | Killworth et al. |
| 5,178,433 A | 1/1993 | Wagner |
| 5,248,134 A | 9/1993 | Ferguson et al. |
| 5,409,283 A | 4/1995 | Ban |
| 5,551,661 A | 9/1996 | Bunker |
| 5,580,028 A | 12/1996 | Tomczak et al. |

(List continued on next page.)

FOREIGN PATENT DOCUMENTS

| | | | |
|---|---|---|---|
| EP | 0552408 A1 | * | 9/1992 |
| JP | 59 186783 | * | 10/1984 |

*Primary Examiner*—Kiran Patel
(74) *Attorney, Agent, or Firm*—Fay, Sharpe, Fagan, Minnich & McKee, LLP

(57) ABSTRACT

A body mount for a vehicle includes a rebound cushion assembly in which a first cushion portion provides a progressive rate buildup to provide travel rebound control and a second cushion portion prevents an upper cushion of the body mount from hitting against the vehicle frame. A clamp member partially encloses the first and second cushion portions. The portions are preferably inner and outer rings interconnected by a thin membrane that allows independent action. The first portion is an elongated member always in compression that has a minimal impact on the system rate and loaded height and the second ring comes into selective contact with the vehicle frame to prevent the upper cushion from being lifted from the vehicle frame.

8 Claims, 3 Drawing Sheets

U.S. PATENT DOCUMENTS

| | | |
|---|---|---|
| 5,722,631 A | 3/1998 | Dorton |
| 5,743,509 A | 4/1998 | Kanda et al. |
| 5,746,411 A | 5/1998 | Bruas et al. |
| 5,799,930 A * | 9/1998 | Willett ..................... 296/35.1 |
| 6,030,016 A * | 2/2000 | Rice ......................... 296/35.1 |
| 6,030,017 A | 2/2000 | Stojkovic et al. |
| 6,062,763 A | 5/2000 | Sirois |
| 6,105,944 A | 8/2000 | David |
| 6,361,096 B2 * | 3/2002 | Kim .......................... 296/35.1 |
| 2001/0052713 A1 * | 12/2001 | Kim .......................... 296/35.1 |

* cited by examiner

TWO STAGE BODY MOUNT REBOUND CUSHION

BACKGROUND OF THE INVENTION

1. Field of the Invention

This invention is directed to a vehicle body mount disposed between a vehicle body and frame to cushion or damp vibration characteristics transferred between the body and frame. More particularly, the invention is directed to an improved two stage rebound cushion used in a body mount.

2. Discussion of the Art

Vehicles are typically equipped with a body mount that serves to isolate the transmission of vibration energy and impact energy from the vehicle and suspension and frame through the vehicle body. The body mount is positioned between the vehicle body and frame and provides vibration damping characteristics or cushioning.

A rebound cushion is typically used in conjunction with the body mount to provide additional cushioning or vibration damping. Rebound cushions normally employ an elastomeric member that is received within a support structure that secures the rebound cushion to the body mount. As will be appreciated, the elastomeric member is formed from plastic, rubber, or composite materials that exhibit energy absorption or vibration damping characteristics.

For example, a simplified rebound cushion includes an annular elastomeric member engaged or retained at one end by a stamped metal plate and a fastener that extends centrally through the plate and elastomeric member. That is, the body mount is disposed between the vehicle body and the frame, while the rebound cushion is located on an opposite face of the frame.

Typically, the rebound cushion of a body mount assembly has conflicting requirements. In order to provide adequate isolation, the rebound cushion must be vertically "soft" so as not to add excessive cushioning rate in that direction. Still another requirement is for the rebound cushion to provide progressive rate buildup and thereby prevent excessive travel during rebound. The rebound cushion also must remain in contact with the vehicle frame through the entire dampening stroke to prevent "slapping" or "popping" that may be exhibited on vehicle rebound.

Known rebound cushion assemblies often address only one of the two extremes. That is, they are either "soft" to satisfy the vibration isolation requirements or are very stiff to satisfy the travel restriction requirement.

It has thus been deemed desirable to provide a rebound cushion that overcomes the disadvantages noted with prior arrangements in a simple, economical manner that can be easily implemented and can be incorporated into known body mount designs.

BRIEF SUMMARY OF THE INVENTION

A rebound cushion for a body mount that provides a low cushioning rate for improved isolation and a second portion that provides rebound travel control and prevents any slapping or popping associated with the assembly. The exemplary embodiment preferably has a first portion in constant compression.

An exemplary embodiment of the two stage rebound cushion has two independent rings. A first or inner ring is elongated and provides for a low vertical system cushioning ring since it is in constant compression even at extended travels. A second or outer ring provides desired rebound travel control upon contact engagement with the vehicle frame.

In a preferred embodiment, the first and second ring portions are interconnected by a thin membrane or web that permits independent motion of the first and second ring portions and yet allows the first and second components to be formed as a single piece assembly.

DETAILED DESCRIPTION OF THE INVENTION

Figure 1:
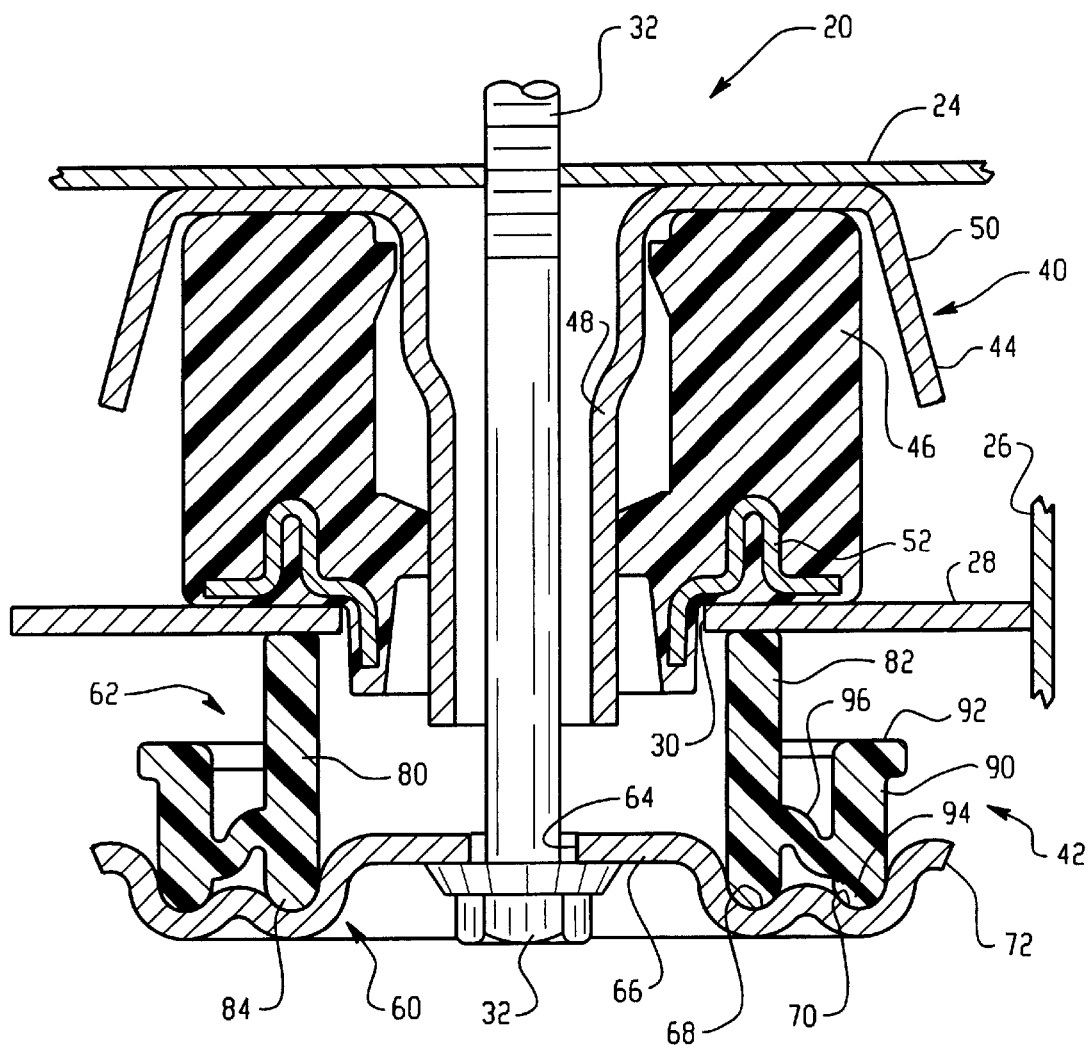
FIG. 1 is a cross-sectional view of an exemplary vehicle frame design incorporating a body mount using the rebound cushion assembly of the present invention.

FIG. 1 illustrates a body mount assembly 20 interposed in a frame system 22 that includes a vehicle body 24 mounted to a vehicle frame 26. Extending from the frame is a pedestal bracket 28 that includes an opening or aperture 30 for receiving a portion of the body mount therethrough. More particularly, individual components forming the body mount are secured in place via a fastener such as retaining bolt 32. This is a conventional fastening arrangement in which the retaining bolt extends through a central opening provided in the body mount assembly, through the opening 30 in the vehicle frame, and threadedly engages the vehicle body 24. Of course, alternative fastening arrangements may be used without departing from the scope and intend of the present invention.

The body mount assembly 20 includes a first member, upper cushion, or upper member 40 and a second member, lower cushion, or lower member 42, also referred to as a rebound cushion assembly. As will be appreciated from FIG. 1, the first and second members are disposed on opposite surfaces of the pedestal bracket 28 and provide cushioning and vibration dampening characteristics as is generally known in the art. The first member 40 includes a cap or helmet 44 that partially encloses an elastomeric member 46, The helmet is typically formed of a stamped metal and includes a stem portion 48 defining an opening that receives the fastener 32 therethrough. Side wall 50 may be continuous or discontinuous about the circumference of the elastomeric member. The elastomeric member 46 may include a metal collar 52 that is substantially enclosed by the elastomeric member.

Figure 2:
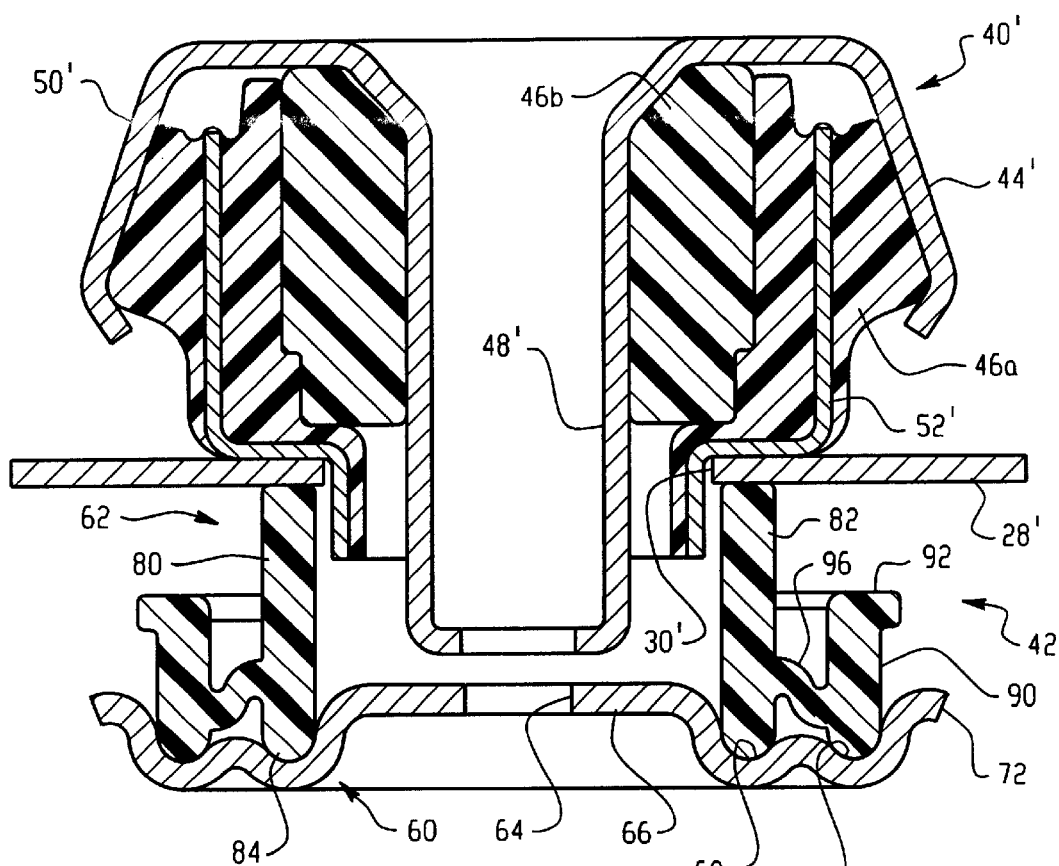
FIG. 2 is a cross-sectional view of a second preferred embodiment illustrating the inventive rebound cushion used in conjunction with a different upper cushion assembly.

It will be appreciated that the first member 40 may adopt different configurations as desired in providing the desired cushioning and vibration damping characteristics of the body mount assembly. Thus, the configuration shown and described herein is merely exemplary as will be appreciated by one skilled in the art. Another embodiment of the first member is illustrated in FIG. 2 where like elements are identified by like reference numerals with a primed suffix (') and new elements are identified by new numerals. Selected components such as the frame and fastener are removed for ease of illustration. The primary difference relates to the configuration of the elastomeric member 46', which is an assembly of two distinct components 46a and 46b. One of the elastomeric components, here the radially outer elastomeric component 46b, includes metal collar 52'. More particular details of the structure and function of the upper body mounts of FIGS. 1 and 2 can be found in U.S. Pat. No. 6,030,016 and pending application Ser. No. 09/256,445, filed Feb. 23, 1999 (CSA 2 0083).

Figure 3:
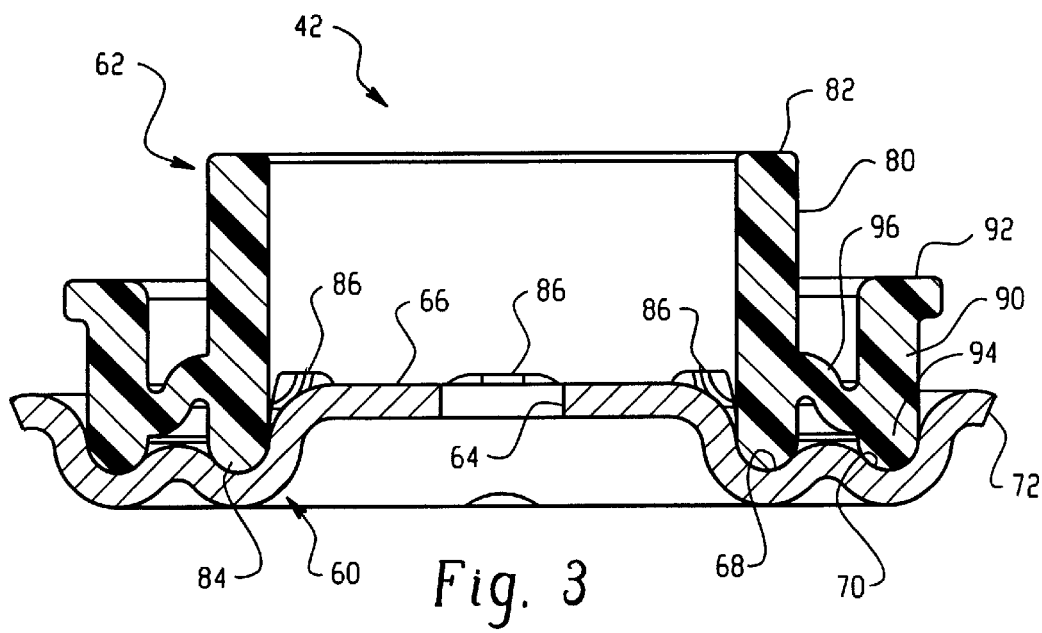
FIG. 3 is a cross-sectional view of the rebound cushion assembly.
Figure 4:
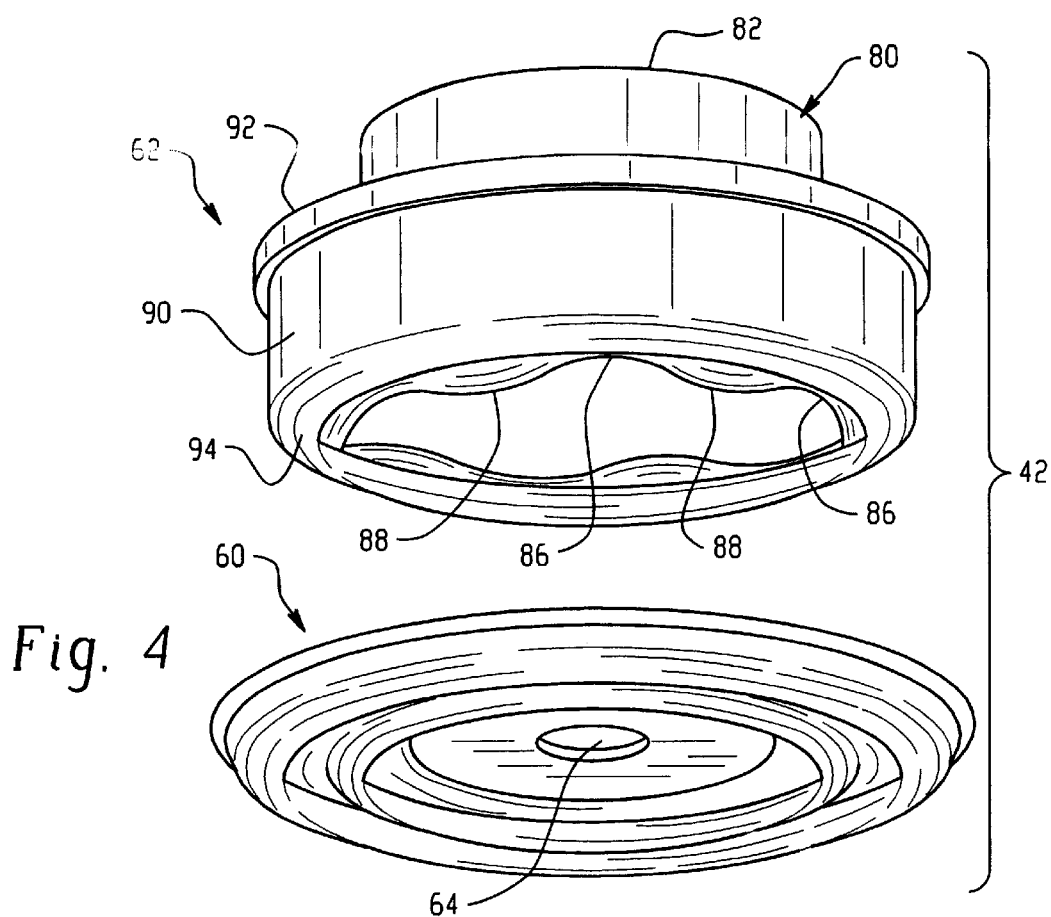
FIG. 4 is an exploded, perspective view of the individual components of the rebound cushion assembly.
Figure 5:
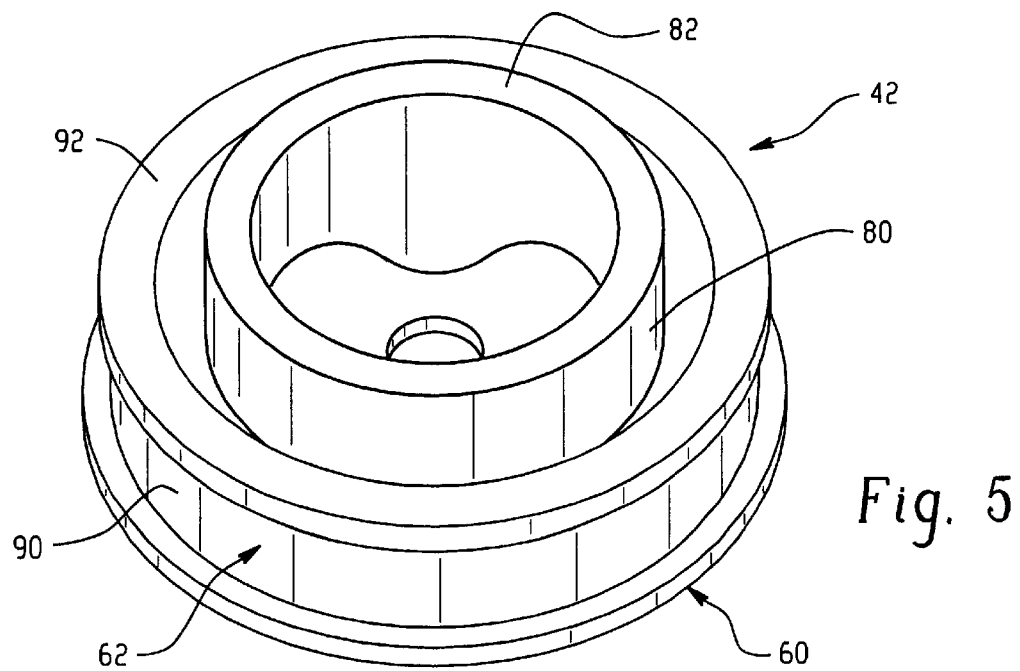
FIG. 5 is a perspective view of the cushion assembly of FIG. 3.

With continued reference to FIGS. 1 and 2, and additional reference to FIGS. 3–5, the second member or rebound cushion assembly 42 will be described in greater detail. In the exemplary embodiment, the rebound cushion assembly includes two discrete components, namely a clamp member 60 and an elastomeric member 62. The clamp member is preferably a stamped metal component having a central opening 64 that receives a portion of the fastener 32 therethrough, specifically a shank portion of the retaining bolt. The opening is preferably provided in a raised central boss 66 that tapers about its perimeter to form a first circumferential groove 68 (FIG. 3) and, spreads radially outward therefrom into a second circumferential groove 70 (preferably concentric with the first groove). An up-turned edge 72 extends about the perimeter of the clamp member and, in conjunction with the fastener, retains the elastomeric rebound cushion assembly radially contained within the clamp member.

The elastomeric member 62 of the rebound cushion assembly satisfies a number of conflicting requirements. Specifically, it is vertically "soft" so as not to add excessive cushioning rate. Stated another way, the vertical cushioning rate absorbs sufficient energy to provide adequate isolation and a smoother ride. The rebound cushion assembly also provides progressive rate build-up to prevent excessive vertical travels during rebound. Moreover, the rebound cushion assembly remains in contact with the vehicle frame through the entire dampening stroke to prevent slapping or popping on vehicle rebound. Slapping or popping occurs when the upper cushion is able to lift off of the vehicle frame and causes an audible slapping or popping noise once it engages the vehicle frame.

These criteria are met by the rebound cushion assembly of the present invention. A two stage rebound cushion satisfies all of these requirements. Specifically, a first cushion portion or inner ring 80 has an extended, long, thin profile that provides a low compression rate for improved isolation. It permits constant compression of the rebound cushion even at extended travel length because the inner ring has an elongated dimension. It is shown in this embodiment as having a first or upper end 82 that is generally planar and adapted to engage the vehicle frame, namely one of the surfaces of the pedestal bracket of the frame. A second end 84 of the inner ring is dimensioned for receipt in the first or inner groove 68 of the clamp member Alternating notches 86 and support ridges 88 are preferably provided about the circumference of the second end of tube elastomeric member first portion. For example, three notches are evident in FIG. 3, while a series of notches and ridges are more apparent in FIG. 4. The notches and ridges allow the first portion or inner cushion to be substantially compressed during a rebound stroke of the rebound cushion assembly and body mount The notches and ridges, in conjunction with the pre-selected durometer of the elastomeric material comprising the inner cushion, produce a desired vertical cushion rate. It will be appreciated, however, that the alternating notches and recesses are not always required and offer additional features that may be useful in selected designs.

A second cushion portion or independent second ring 90 is preferably concentrically received about the inner ring. It bas a substantially reduced length or height relative to the inner ring, on the order of one-half its height in an uncompressed state. First or upper end 92 is adapted for selective engagement with the vehicle frame, but in a normal, unloaded condition, the surface 92 is spaced from the vehicle frame. The second ring comes into contact with the vehicle frame during rebound travel control. It thus provides progressive rate buildup to prevent excessive rate of travel during rebound. In this manner, the upper cushion is unable to lift off the vehicle frame and any slapping or popping noise caused by the upper cushion hitting the vehicle frame is avoided. A second end 94 of the outer ring is received in and radially constrained by the outer groove 70. Just as the inner ring 80 incorporated alternating notches and recesses for selected designs, it will be appreciated that the second ring 90 may also adopt an alternating notch and recess configuration to provide a progressive rate build up when the rebound cushion is placed under compression.

As will be evident to one skilled in the art, the exemplary embodiment of the rebound cushion and body mount design provides an assembly that has minimal impact on the system rate and the loaded height. Moreover, it is always in compression regardless of the amount of travel, and further has the advantageous, significant rebound travel control through a progressive rate buildup by using two independent rings, where the rings address separate The extended length of the inner ring as evidenced in FIG. 3, and even more apparent in FIGS. 1 and 2 where it is shown in an uncompressed state. If desired, the elastomeric member 46 or upper cushion can be designed to provide a greater load carrying ability while the lower cushion assembly maintains a low vertical system rate. The rings are preferably connected by a thin membrane 96 that has a reverse curved conformation allowing independent movement of the rings relative to one another. On the other hand, interconnecting the rings by use of the thin membrane 96 permits molding an assembly of the components as a single piece.

Even though the first and second rings are molded as a single piece, it will be appreciated that these portions or rings may have different durometer levels to address the individual features that the independent rings are to satisfy. Likewise, location of the inner and outer rings relative to one another is facilitated through use of the thin membrane 96. In addition, the grooves 68, 70 of the clamp member receive and support the second ends of the inner and outer rings, respectively, to maintain the independent action and function of the rings.

The invention has been described with reference to the preferred embodiments. Obviously, modifications and alterations will occur to others upon a reading and understanding of the present invention. It is intended to include all such modifications and alterations insofar as they come within the scope of the appended claims or the equivalents thereof.

What is claimed is:

1. A rebound cushion assembly for a body mount assembly having an upper cushion, the rebound cushion assembly comprising:

a first cushion portion for significant travel rebound control through progressive rate buildup;

a second cushion portion that precludes engagement of an associated upper cushion with the vehicle frame; and a clamp member for at least partially enclosing the first and second cushion portions.

2. The rebound cushion assembly of claim 1 wherein the first and second cushion portions are interconnected by a thin membrane.

3. The rebound cushion assembly of claim 1 wherein the first cushion portion has an elongated profile that permits constant compression of the rebound cushion assembly even at extended lengths.

4. The rebound cushion assembly of claim 1 wherein the first cushion portion has a greater length than the second cushion portion.

5. The rebound cushion assembly of claim 1 wherein the second cushion portion is an annular wall radially s paced from the first cushion portion.

6. The rebound cushion assembly of claim 1 wherein the first and second cushion portions are radially spaced apart and interconnected by a membrane.

7. The rebound cushion assembly of claim 1 wherein the first cushion portion has alternating support ridges and notches circumferentially spaced about one end thereof.

8. The rebound cushion assembly of claim 1 wherein the first cushion portion is dimensioned for constant compression.

* * * * *